United States Patent
Ryu et al.

(10) Patent No.: US 9,173,260 B2
(45) Date of Patent: Oct. 27, 2015

(54) PWM SIGNAL GENERATING CIRCUIT FOR DC-DC CONVERTER USING DIMMING SIGNAL AND LED DRIVER CIRCUIT USING THE SAME IN DIGITAL PWM METHOD HAVING FIXED PHASE MODE

(75) Inventors: Beom-seon Ryu, Cheonju-si (KR); Chang-sik Lim, Cheongju-si (KR)

(73) Assignee: MAGNACHIP SEMICONDUCTOR, LTD., Cheongju-si (KR)

( * ) Notice: Subject to any disclaimer, the term of this patent is extended or adjusted under 35 U.S.C. 154(b) by 347 days.

(21) Appl. No.: 13/285,425

(22) Filed: Oct. 31, 2011

(65) Prior Publication Data

US 2012/0112656 A1 May 10, 2012

(30) Foreign Application Priority Data

Nov. 10, 2010 (KR) ........................ 10-2010-0111765

(51) Int. Cl.
*H05B 33/08* (2006.01)

(52) U.S. Cl.
CPC ........ *H05B 33/0812* (2013.01); *H05B 33/0815* (2013.01); *Y02B 20/343* (2013.01); *Y02B 20/346* (2013.01)

(58) Field of Classification Search
CPC ........... H05B 33/0839; H05B 33/0818; H05B 33/086; H05B 33/0863
USPC ........................................................ 315/301
See application file for complete search history.

(56) References Cited

U.S. PATENT DOCUMENTS

| | | | |
|---|---|---|---|
| 4,870,665 A * | 9/1989 | Vaughn ........................ | 327/114 |
| 7,321,203 B2 | 1/2008 | Marosek | |
| 7,843,148 B2 * | 11/2010 | Gater et al. .................... | 315/291 |
| 2004/0095266 A1 * | 5/2004 | Kernahan et al. ............. | 341/165 |
| 2006/0214603 A1 * | 9/2006 | Oh et al. ....................... | 315/246 |
| 2006/0279438 A1 | 12/2006 | Kishi et al. | |
| 2007/0085522 A1 * | 4/2007 | Mariani et al. ................ | 323/284 |
| 2007/0210725 A1 * | 9/2007 | Marosek ........................ | 315/291 |
| 2008/0048582 A1 * | 2/2008 | Robinson ...................... | 315/291 |
| 2008/0203932 A1 * | 8/2008 | Ball ............................... | 315/189 |

(Continued)

FOREIGN PATENT DOCUMENTS

| CN | 10-1438623 A | 5/2010 |
|---|---|---|
| JP | 2006-303663 A | 11/2006 |

(Continued)

OTHER PUBLICATIONS

Navy Electricity and Electronics Training Series, Module 13-Introduction to Number Systems and Logic, Non Resident Training Course, Sep. 1998.*

(Continued)

*Primary Examiner* — Alexander H Taningco
*Assistant Examiner* — Christine Johnson
(74) *Attorney, Agent, or Firm* — NSIP Law

(57) ABSTRACT

A PWM signal generating circuit and method, and an LED driver circuit using same, is disclosed. The PWM signal generating circuit generates a PWM signal for a DC-DC converter using a dimming signal, and includes an oscillator which generates a first clock signal having a predetermined frequency, a synchronizing unit which synchronizes the dimming signal to the first clock signal, and a PWM signal generating unit which generates the PWM signal in response to the first clock signal having a falling edge while the synchronized dimming signal is on.

20 Claims, 6 Drawing Sheets

(56) References Cited

U.S. PATENT DOCUMENTS

| | | | |
|---|---|---|---|
| 2009/0096392 A1 | 4/2009 | Chandran et al. | |
| 2009/0251062 A1* | 10/2009 | Hagino et al. | 315/276 |
| 2010/0090530 A1* | 4/2010 | Watanabe | 307/37 |
| 2010/0259177 A1* | 10/2010 | Mednik et al. | 315/185 R |

FOREIGN PATENT DOCUMENTS

| | | |
|---|---|---|
| JP | 2009-530790 A | 8/2009 |
| KR | 10-2007-0003415 | 1/2007 |
| KR | 10-2010-0050908 | 5/2010 |
| KR | 10-0958916 B1 | 5/2010 |
| WO | WO 2009/098800 A1 | 8/2009 |

OTHER PUBLICATIONS

Office Action issued in counterpart Korean Patent Application No. 10-2011-0111765 on Jan. 31, 2012.

Chinese Office Action mailed Nov. 4, 2014 in counterpart Chinese Application No. 201110372280.5 (25 pages, in Chinese, with complete English translation).

* cited by examiner

PWM SIGNAL GENERATING CIRCUIT FOR DC-DC CONVERTER USING DIMMING SIGNAL AND LED DRIVER CIRCUIT USING THE SAME IN DIGITAL PWM METHOD HAVING FIXED PHASE MODE

CROSS-REFERENCE TO RELATED APPLICATION

This application claims the benefit under 35 U.S.C. §119 (a) of Korean Patent Application No. 2010-0111765, filed in the Korean Intellectual Property Office on Nov. 10, 2010, the entire disclosure of which is incorporated herein by reference for all purposes.

BACKGROUND

1. Field

The following description relates to a PWM signal generating circuit for a DC-DC converter using a dimming signal and an LED driver circuit using the same, and, more specifically, a PWM signal generating circuit for a DC-DC converter which is capable of reducing a voltage ripple by generating a dimming signal which synchronizes with an internal clock, and an LED driver circuit using the same.

2. Description of the Related Art

An LCD (Liquid Crystal Display) type of display apparatus is thin and light compared to other types of display apparatuses. An LCD has a low driving voltage and consumes little electric power, and thus had become popular and widely used. However, since an LCD is a non-light-emitting element, and thus cannot emit light by itself, a separate backlight is used for providing light to an LCD panel.

Conventionally, a Cold Cathode Fluorescent Lamp (CCFL) and a Light Emitting Diode (LED) are two elements that are used as the aforementioned backlight source of an LCD. However, since the CCFL uses mercury, it may cause environmental pollution, as well as having a low speed response. In addition, the CCFL has other disadvantages such as poor color reproduction and not being appropriate to realize an LCD panel which has a high density, small size, and thin shape.

On the other hand, the LED does not use a material harmful to the environment, and is capable of performing with faster response time as compared to the CCFL. In addition, the LED has the advantages of good color reproduction and an ability to adjust brightness and color temperature arbitrarily by adjusting the amount of light of red, green, and blue LEDs. In addition, the LED is suitable for realizing an LCD panel of a high density, small size, and thin shape. Therefore, the LED has become more widely used as a light source for a backlight of an LCD panel in recent years.

As such, in conventional applications, if an LCD backlight using an LED employs a plurality of LEDs connected in a serial fashion, a driving circuit to provide constant current to the LEDs is required, and a dimming circuit to arbitrarily adjust brightness and color temperature arbitrarily, or perform temperature compensation, is required.

In more detail, different dimming methods used in an LCD backlight using an LED include an analog dimming method and digital dimming methods. The analog dimming method includes adjusting the brightness of the LED by adjusting an amount of electric current supplied to each of the LEDs. A pulse width modulation (PWM) dimming method, which is one of the digital dimming methods, includes adjusting the brightness of the LED by adjusting a ratio of on-off time of each LED. For example, if a PWM signal having an on-off time ratio of 4:1 is provided to each LED, the brightness of the LED reaches 80% of maximum brightness.

In order to adjust the brightness of the LED in the above-described digital dimming method, a clock signal of a DC-DC converter for adjusting power of the LED and a dimming signal for adjusting an amount of electric current in the LED are separately provided. In general, the frequency of the clock signal of the DC-DC converter is relatively high, and the frequency of the dimming signal is relatively low, and the clock signal of the DC-DC converter and the dimming signal are not synchronized with each other. Further, an on-period of the clock signal and the dimming signal are typically very short relative to the overall period of the respective signals.

Since, as discussed above, the clock signal and dimming signal of the DC-DC converter are not synchronized with each other, there is a problem of the actual time difference (tdr) between the clock signal and digital dimming signal changing at every cycle. This matter will be explained hereinafter in more detail with reference to FIG. 6.

FIG. 6 illustrates waveforms occurring in operations of generating a PWM signal based on a conventional dimming signal. Referring to FIG. 6, 'B_CLK' is a boosting clock signal, and 'FPWM' is a dimming signal generated inside an LED driver circuit according to an external control signal. In addition, 'PWM_OUT' is a PWM signal which is provided to a gate of a power transistor of a DC-DC converter.

With reference to FIG. 6, since the clock signal (B_CLK) and the dimming signal (FPWM) are not synchronized with each other, it can been seen that a delay value (tdri, the time from a rising edge of the dimming signal to a declining edge of the next clock signal, two examples of which being identified in FIG. 6 as tdr1 and tdr2) changes at every FPWM cycle. As such, there is a problem that in the case that such a PWM signal is not output periodically as aforementioned, the ripple of the output voltage of the DC-DC converter is increased.

SUMMARY

Aspects of the various examples described herein relate to generating a dimming signal which is synchronized with an internal clock, thereby providing a PWM signal generating circuit for reducing a ripple of an output voltage, and an LED driving circuit using the same.

In one general aspect, there is provided a PWM signal generating circuit which generates a PWM signal for a DC-DC converter using a dimming signal, the PWM signal generating circuit including an oscillator which generates a first clock signal having a predetermined frequency, a synchronizing unit which synchronizes the dimming signal to the first clock signal, and a PWM signal generating unit which generates the PWM signal in response to the first clock signal having a falling edge while the synchronized dimming signal is on.

The PWM signal generating circuit may further include a dimming signal generating unit which generates a dimming signal according to cycle information and on duty information input from outside.

The PWM signal generating circuit may further include a controlling unit which receives feedback regarding a voltage of the DC-DC converter generated by the generated PWM signal and controls operations of the PWM signal generating unit.

The synchronizing unit may move an on section of the dimming signal to a next clock point in the first clock signal and output the synchronized dimming signal.

The synchronizing unit may move the on section of the dimming signal to a falling edge point of the first clock signal which comes after a rising edge of the dimming signal.

The synchronizing unit may include a first counter which counts a length of an on state of the dimming signal using a second clock signal, a second counter which counts a length of an on state of the dimming signal using the second clock signal, a register which stores a counter value received from the first counter, a comparer which compares the stored counter value of the first counter and the counter value of the second counter value, a first AND gate which outputs an AND result of the dimming signal and the first clock signal, a second AND gate which outputs an AND result of the output of the first AND gate and the second clock signal, and an RS flipflop which receives the output signal of the comparer as a reset signal, and receives the output signal of the second AND gate as a set signal and outputs the synchronized dimming signal.

In another general aspect, there is provided an LED driver circuit which includes a dimming signal generating unit which generates a dimming signal according to a control signal for driving an LED array, a synchronizing unit which synchronizes the generated dimming signal to a first clock signal, a PWM signal generating unit which generates a PWM signal in response to the first clock signal having a falling edge while the synchronized dimming signal is on, a DC-DC converter which provides an output voltage to the LED array using the PWM signal, and an LED driving unit which drives the LED array using the generated dimming signal.

The PWM signal generating unit may include an oscillator which generates the first clock signal.

The PWM signal generating unit may further include a controlling unit which receives feedback regarding a voltage of the DC-DC converter generated by the PWM signal and controls operations of the PWM signal generating unit.

The synchronizing unit may move an on section of the dimming signal to a next clock point in the first clock signal and output it.

The synchronizing unit may move the on section of the dimming signal to a falling edge point of the first clock signal which comes after a rising edge of the dimming signal and output the synchronized dimming signal.

The synchronizing unit may include a first counter which counts a length of the on section of the dimming signal using the second clock signal, a second counter which counts a length of the on section of the dimming signal using the second clock signal, a register which stores a counter value received from the first counter, a comparer which compares the stored counter value of the first counter and the stored counter value of the second counter, a first AND gate which outputs an AND result of the dimming signal and the first clock signal, a second AND gate which outputs an AND result of the output of the first AND gate and the second clock signal, and an RS flipflop which receives the output signal of the comparer as a reset signal, and receives an output signal of the second AND gate as a set signal, and outputs the synchronized dimming signal.

The dimming signal generating unit, the synchronizing unit, the PWM signal generating unit, and the LED driver unit may be realized in one chip.

In another general aspect, there is provided a method of generating a PWM signal for a DC-DC converter using a dimming signal, the method including generating a dimming signal, synchronizing the dimming signal to a clock signal, and generating the PWM signal in response to the clock signal having a falling edge while the synchronized dimming signal is on.

The method may further include generating the clock signal.

The method may further include generating the dimming signal according to externally input duty information.

The synchronization of the dimming signal may include moving an on period of the dimming signal to a next clock point in the clock signal.

Other features and aspects will be apparent from the following detailed description, the drawings, and the claims.

Figure 1:
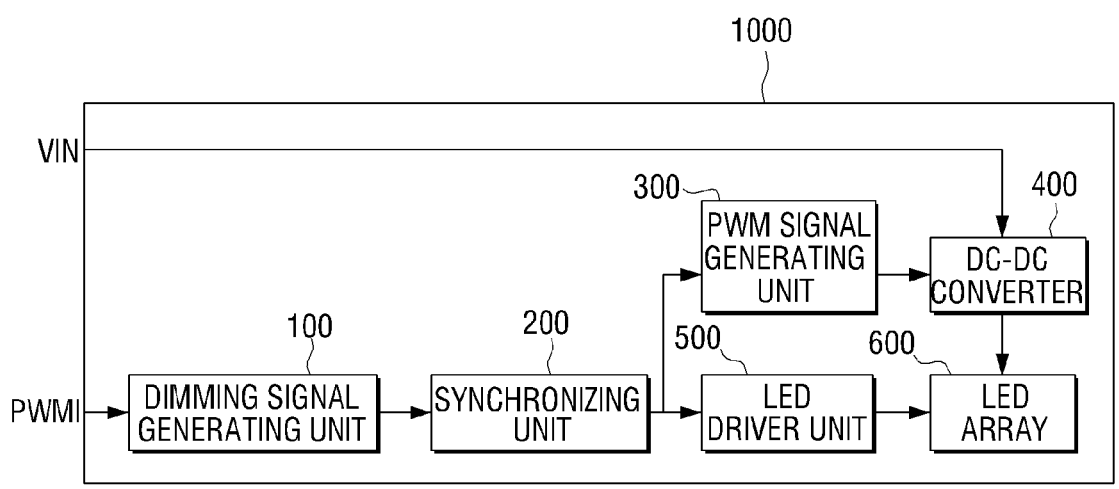
FIG. 1 illustrates a configuration of an example embodiment of an LED driver circuit.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses, and/or methods described herein will be suggested to those of ordinary skill in the art. Also, descriptions of well-known functions and constructions may be omitted for increased clarity and conciseness.

FIG. 1 illustrates an example embodiment of an LED driver circuit (or a light-emitting diode driver circuit, hereinafter referred to as an LED driver circuit).

With reference to FIG. 1, the example LED driver circuit 1000 includes a dimming signal generating unit 100, a synchronizing unit 200, a PWM signal generating unit 300, a DC-DC converter 400, an LED driver unit 500, and an LED array 600.

The dimming signal generating unit 100 generates a dimming signal according to a control signal for driving the LED. More specifically, various digital dimming methods for LED exist, such as, for example, a direct mode, a fixed phase mode, a phase shift mode, etc. The direct mode is a method of controlling both the PWM frequency and on duty, or length of the on-period, from the outside (PAD), and the fixed phase mode and the phase shift mode are methods of generating PWM frequency internally and receiving only the on duty from the PAD and controlling it. The presently described example operates in the fixed phase mode, and thus the dimming signal generating unit 100 receives an on duty from the outside. Therefore, the dimming signal generating unit 100 may generate a dimming signal for LED dimming using an on duty received from outside and its own PWM frequency generated internally.

The synchronizing unit 200 synchronizes the generated dimming signal with a first clock signal. More specifically, the synchronizing unit 200 may move an on section of the dimming signal generated in the dimming signal generating unit 100 to a next clock point of the first clock signal which is used by the PWM signal generating unit 300, to be described hereinafter. Herein, the synchronizing unit 200 may move the on section of the dimming signal to a falling edge point of the first clock signal which comes after a rising edge of the dimming signal. The configuration of the synchronizing unit 200 will be explained in more detail hereinafter with reference to FIG. 3.

The PWM signal generating unit 300 generates a PWM signal using the synchronized dimming signal. More specifically, in response to the synchronized dimming signal of the synchronizing unit 200 being on, the PWM signal generating unit 300 may generate a PWM signal having a rising edge if the internal clock signal is on a falling edge. The configuration of the PWM signal generating unit 300 will be explained in more detail hereinafter with reference to FIG. 2.

The DC-DC converter 400 provides an output voltage to the LED array using the PWM signal. More specifically, the DC-DC converter 400 converts the voltage based on the PWM signal generated in the PWM signal generating unit 300, and provides the converted DC voltage to the LED array 600. Herein, the DC-DC converter 400 may provide the voltage corresponding to a forward bias voltage of the LED array 600 so that the LED array 600 can operate in the saturation area.

The LED driving unit 500 drives the LED array using the dimming signal. More specifically, the LED driving unit 500 may adjust the driving current in the LED array 600 using the dimming signal synchronized in the synchronizing unit 200.

As aforementioned, the LED driver circuit 1000 according to this example embodiment synchronizes the dimming signal to the internal clock signal, thereby minimizing the output voltage ripple in the DC-DC converter 300. Furthermore, the LED driver circuit 1000 can provide the output voltage to the LED array 600 stably, and thus prevent occurrence of a ripple due to a large overshoot, thereby preventing a flicker and occurrence of noise.

In the description of FIG. 1, the dimming signal generating unit 100 and the synchronizing unit 200 were described as separate configurations, but the dimming signal generating unit 100 and the synchronizing unit 200 may be realized as one configuration.

Figure 2:
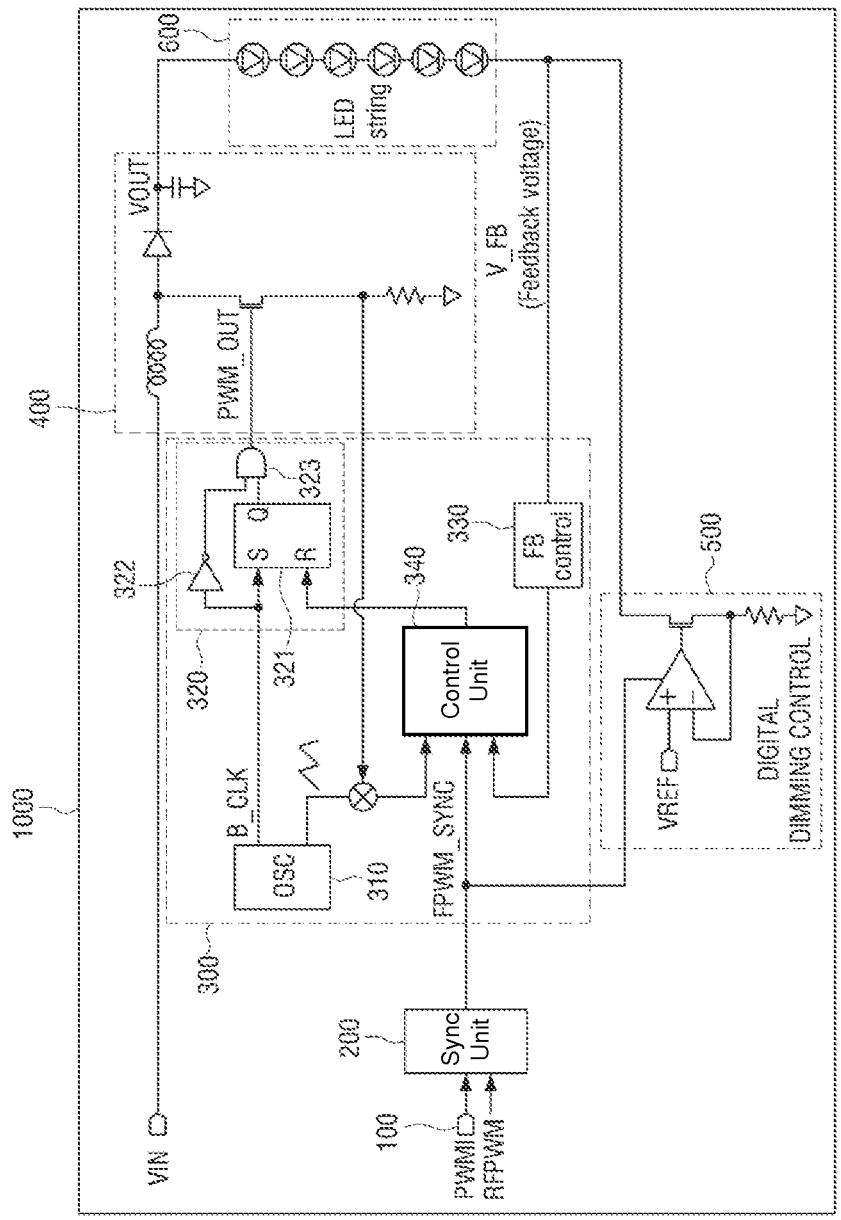
FIG. 2 illustrates an example embodiment of a circuit diagram of the LED driver circuit.

FIG. 2 illustrates an example circuit diagram of an LED driver circuit.

With reference to FIG. 2, the LED driver circuit 1000 includes the dimming signal generating unit 100, the synchronizing unit 200, the PWM signal generating unit 300, the DC-DC converter 400, the LED driving unit 500, and the LED array 600. One or more of the dimming signal generating unit 100, the synchronizing unit 200, the PWM signal generating unit 300, and the LED driving unit 500 may be realized in one chip.

The dimming signal generating unit 100 generates the dimming signal FPWM according to the control signal PWMI for driving the LED.

Furthermore, the synchronizing unit 200 synchronizes the generated dimming signal FPWM to the first clock signal B_CLK. More specifically, the synchronizing unit 200 may move the on section of the dimming signal FPWM generated in the dimming signal generating unit 100 to the next clock point of the first clock signal B_CLK of the oscillator 310, to be described below, and output the changed dimming signal. The specific configuration and operations of the synchronizing unit 200 will be described with reference to FIG. 3.

Meanwhile, the synchronizing unit 200 may perform the functions of the dimming signal generating unit 100 together with the already described functions of the synchronizing unit 200. More specifically, the synchronizing unit 200 may receive the control signal PWMI (more specifically, on duty), the RFPWM (PWM frequency information) from inside of the LED driver circuit 1000, and the first clock signal B_CLK of the oscillator 310, and generate a dimming signal FPWM_SYNC synchronized with the falling edge of the first clock signal B_CLK of the oscillator 310.

The PWM signal generating unit 300 generates the PWM signal PWM_OUT provided to the DC-DC converter 400. More specifically, the PWM signal generating unit 300 includes the oscillator 310, a signal generating unit 320, a feedback unit 330, and a controlling unit 340.

The oscillator 310 generates the first clock signal B_CLK having a predetermined frequency.

In response to the synchronized dimming signal PMWI_SYNC being on, the signal generating unit 320 generates the PWM signal having the rising edge if the first clock signal B_CLK is a falling edge. More specifically, the signal generating unit 320 may consist of an RS flipflop 321, a NOT gate 322, and an AND gate 323.

The RS flipflop 321 receives a set input of the first clock signal B_CLK of the oscillator 321, and receives a reset input of an output of the controlling unit 340. In addition, the RS flipflop 321 provides the output to the AND gate 323. Herein, the RS flipflop 321 is a flip-flop which outputs '1' in response to a set signal being input, and outputs '0' in response to a reset signal being input.

The NOT gate 322 receives an input of the first clock signal B_CLK of the oscillator 310, and reverses the first clock signal B_CLK of the input oscillator 310 and outputs the reversed first clock signal to the AND gate 223.

The AND gate 323 receives input of the output signal of the RS flipflop 321 and the output signal of the NOT gate 322, and outputs the AND logical result of the output signal of the RS flipflop 321 and the output signal of the NOT gate 322 as the PWM signal PWM_OUT.

The feedback unit 330 measures the power supplied to the LED array 600, and provides the measured power to the controlling unit 340. Illustrations present examples of measuring the voltage V_FB of the node at which the LED array 600 and the LED driving unit 500 meet, but the measurement point is not limited thereto. For example, such a function may be realized in the form of measuring the output node voltage Vout of the DC-DC converter.

The controlling unit 340 controls the signal generating unit 320. More specifically, the controlling unit 340 receives the first clock signal B_CLK generated in the oscillator 310, the synchronized dimming signal FPWM_SYNC of the synchronized unit 200, and the feedback signal of the feedback unit 330, and in response to the synchronized dimming signal FPWM_SYNC being on, may control the signal generating unit 320 so as to generate the PWM signal having a rising edge if the first clock signal B_CLK is a falling edge. Furthermore, the controlling unit 340 may control the signal generating unit 320 so that the PWM signal is not generated in response to the power supplied to the LED array 600 being the same or more than the predetermined voltage.

The DC-DC converter 400 may consist of a booster switch having an inductor, a booster gate, and a diode. The DC-DC converter 400 illustrated in FIG. 2 may perform the same operations as a general booster switch, and thus a detailed description thereof will be omitted.

The LED driver unit 500 is a constant current controller. A detailed description of the LED driver unit 500 illustrated in FIG. 2 will be omitted, as the constant current controller of the LED driver unit 500 may be represented by a constant current controller conventionally used in an LED driver circuit.

Figure 3:
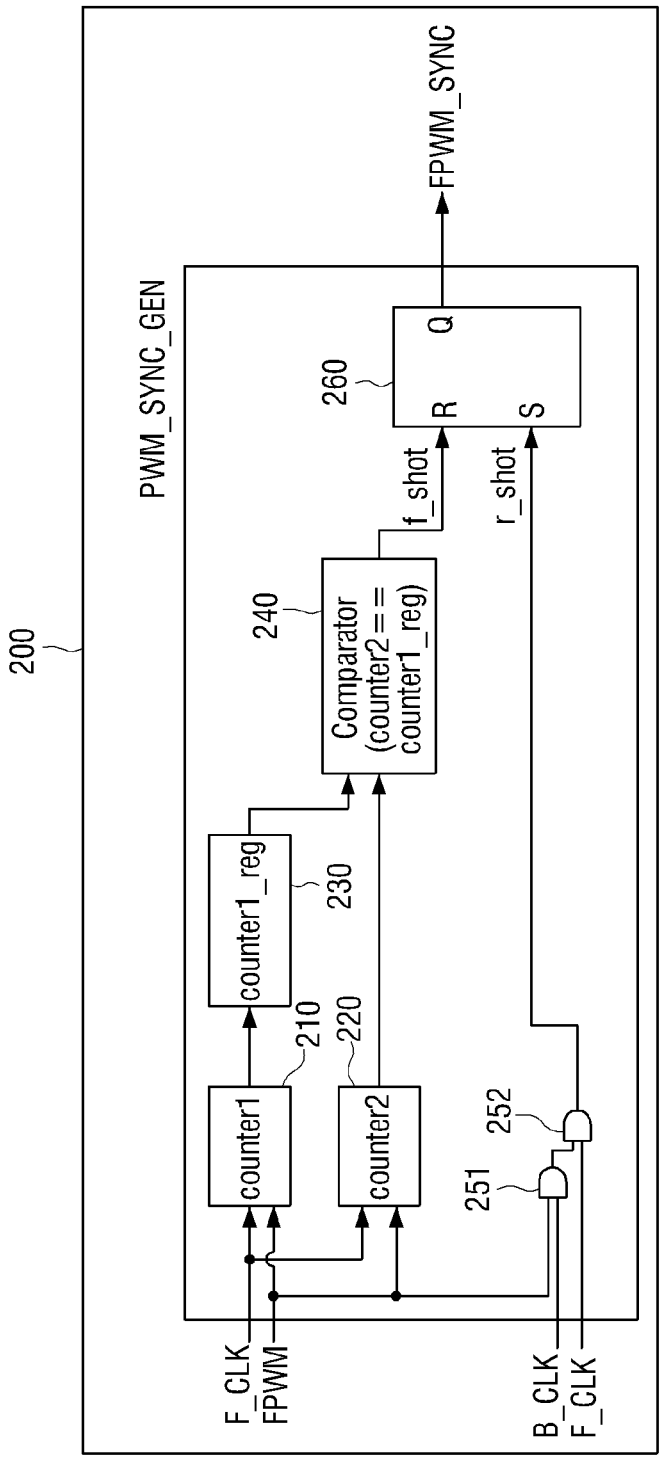
FIG. 3 illustrates an example configuration of a synchronizing unit of FIG. 2.

FIG. 3 illustrates an example configuration of a synchronizing unit 200 of FIG. 2.

With reference to FIG. 3, the synchronizing unit 200 includes a first counter 210, a second counter 220, a register 230, a comparer 240, a first AND gate 251, a second AND gate 252, and an RS flipflop 260.

The first counter 210 counts the length of the on state of the dimming signal FPWM using the second clock signal F_CLK. More specifically, the first counter 210 counts the length of the on state of the dimming signal FPWM generated in the dimming signal generating unit 100 using the second clock signal F_CLK which has a higher frequency that the first clock signal B_CLK.

The second counter 220 counts the length of the on state of the dimming signal FPWM using the second clock signal F_CLK. More specifically, the second counter 220 counts the length of the off state of the dimming signal FPWM generated in the dimming signal generating unit 100 using the second clock signal F_CLK which has a higher frequency than the first clock signal B_CLK.

The register 230 stores the counter value of the first counter 210.

The comparer 240 compares the counter value of the first counter 210 stored in the register 230 and the counter value of the second counter 220.

The first AND gate 251 receives input of the dimming signal FPWM and the first clock signal B_CLK of the oscillator 310, and outputs the AND logical result of the input dimming signal FPWM and the first clock signal B_CLK of the oscillator 310.

The second AND gate 252 receives inputs of the output signal of the first AND gate 251 and the second clock signal F_CLK, and outputs the AND logical result of the output signal of the first AND gate 251 and the second clock signal F_CLK.

The RS flipflop 260 receives input of the output signal f_shot of the comparer 240 as a reset signal, and receives the output signal r_shot of the second AND gate 252 as a set signal, and outputs the synchronized signal FPWM_SYNC.

Hereinafter, the operations of the synchronizing unit 200 will be described in more detail with reference to FIG. 4.

Figure 4:
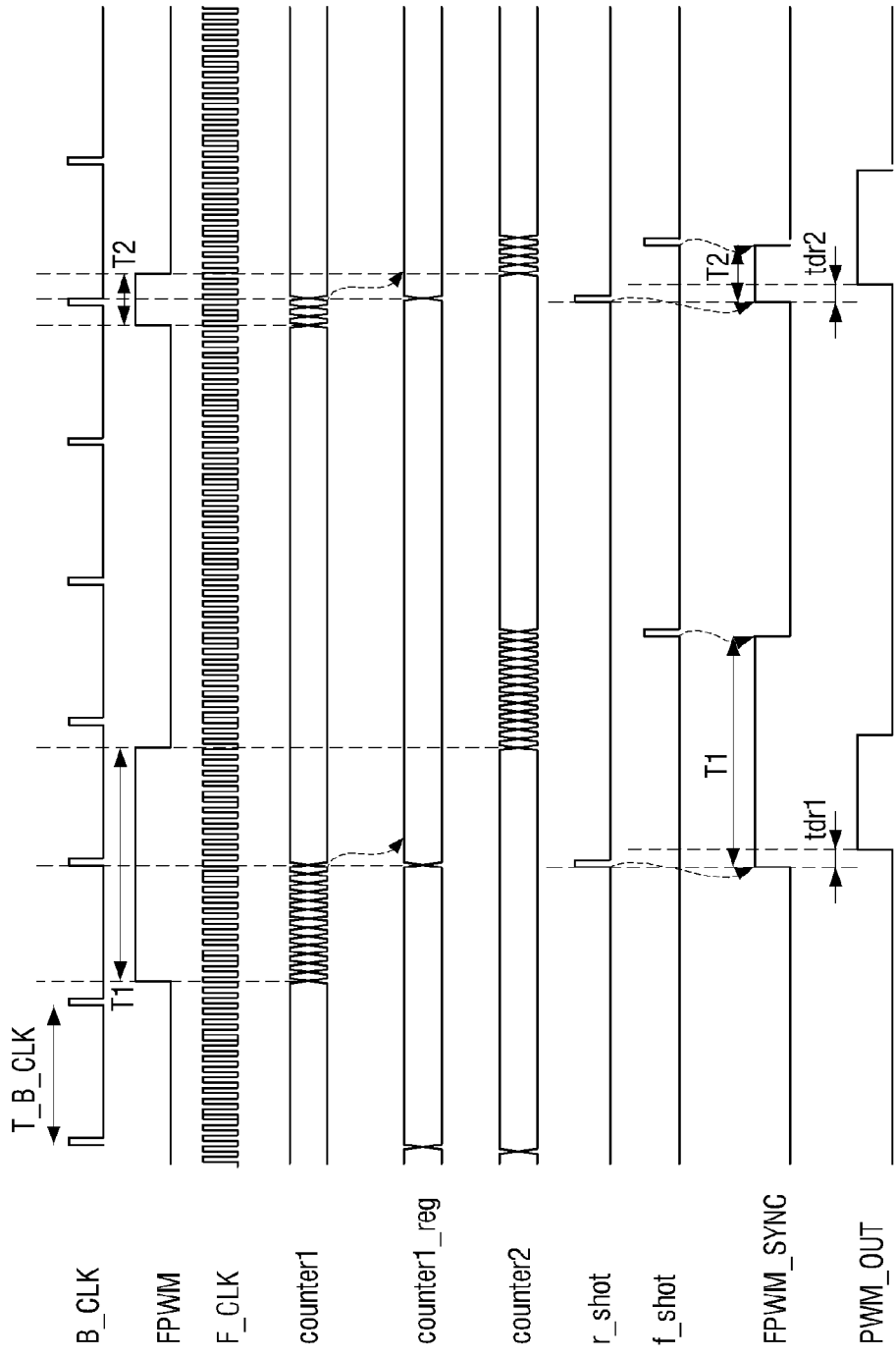
FIG. 4 illustrates waveforms occurring in operations of the synchronizing unit according to an example embodiment.

FIG. 4 illustrates waveforms occurring in operations of the synchronizing unit 200 according to an example embodiment.

In FIG. 4, the first clock signal B_CLK, the dimming signal FPWM, the second clock signal F_CLK, the output signal of the first counter 210 (counter 1), the output signal of the register 230 (conter1_reg), the output signal of the second counter 220 (counter2), the output of the second AND gate 252 (r_shot), the output signal of the comparer 240 (f_shot), the output of the RS flipflop 260 (FPWM_SYNC), and the PWM signal (PWM_OUT).

In response to the control signal for driving the LED array 600 being input, the dimming signal generating unit 100 generates the dimming signal FPWM, and the first counter 210 counts the length from the rising edge of the dimming signal FPWM to the rising edge of the first clock signal B_CLK using the second clock signal F_CLK. The result of the counting operation by the first counter 210 is transmitted to the register 230.

The comparer 240 outputs the output signal f_shot at the point delayed by the counting value stored in the register 230 from the falling edge of the dimming signal FPWM.

In that the RS flipflop 260 receives an input of the output signal r_shot from the second AND gate 252 as a set signal, and receives the output signal f_shot from the comparer 240 as a reset signal, the RS flipflop 260 may rise at the rising edge of the first clock signal B_CLK, and generate the dimming signal FPWM_SYNC synchronized with the clock signal B_CLK falling after the on duty period of the dimming signal.

As aforementioned, as the first clock signal B_CLK and the dimming signal FPWM are synchronized, the PWM signal PWM_OUT having a certain cycle is provided to the DC-DC converter 400. The PWM signal having a certain cycle is provided to the DC-DC converter 400, and thus the ripple of the output voltage of the DC-DC converter 400 may be minimized.

Figure 5:
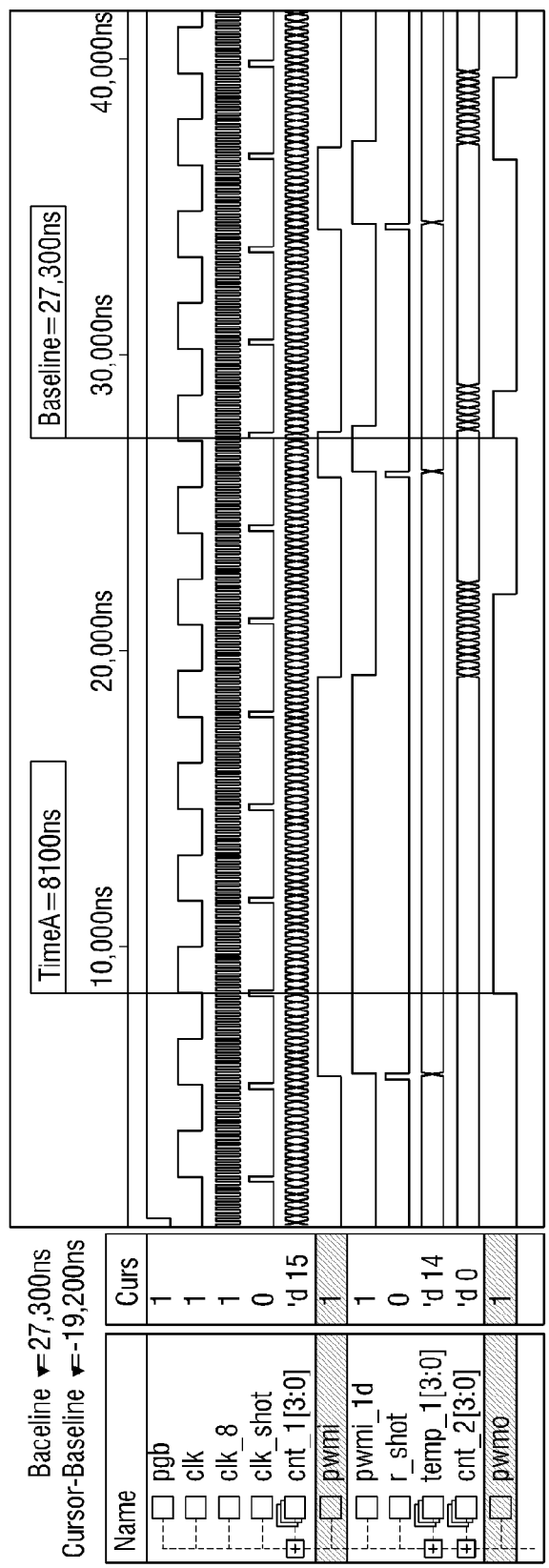
FIG. 5 illustrates waveforms occurring in a simulation result of the synchronizing unit of FIG. 3.
Figure 6:
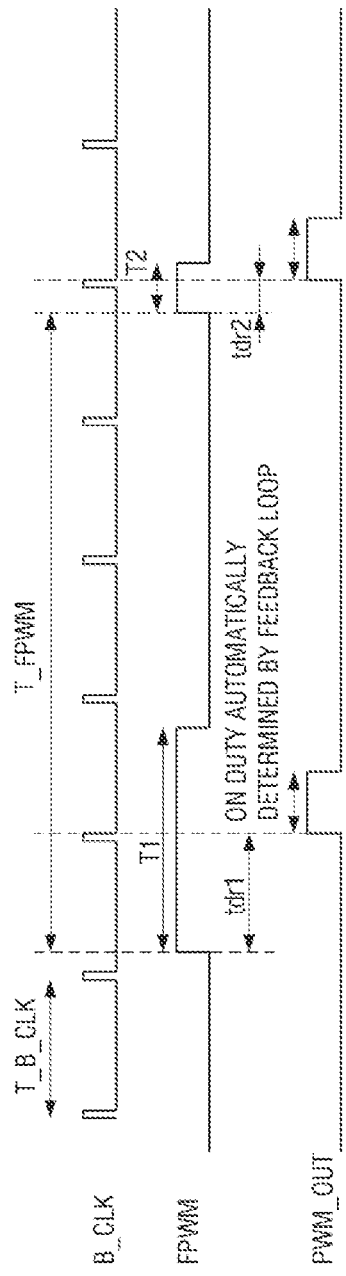
FIG. 6 illustrates waveforms occurring in a generation of a PWM signal based on a conventional dimming signal.

FIG. 5 illustrates waveforms occurring during the simulation result of the synchronizing unit 200 of FIG. 3.

With reference to FIG. 5, it can be seen that the dimming signal PWMI is synchronized to the first clock signal CLK_SHOT. Likewise, as the dimming signal PWMI is synchronized to the first clock signal CLK_SHOT, the time distance of the rising edge of the PWM signal generated in the signal generating unit 320 becomes the same. The PWM signal rises at such a same cycle, and the ripple of the output voltage in the DC-DC converter 400 may be reduced.

The processes, functions, methods, and/or software described herein may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A pulse-width modulation (PWM) signal generating circuit configured to generate a PWM signal for a direct current to direct current (DC-DC) converter based on a dimming signal, the PWM signal generating circuit comprising:
   an oscillator configured to generate a first clock signal having a predetermined frequency;
   a synchronizing unit configured to generate a synchronized dimming signal by synchronizing the dimming signal to the first clock signal; and
   a PWM signal generating unit configured to generate the PWM signal having a rising edge in response to the first clock signal having a falling edge while the synchronized dimming signal is on.

2. The PWM signal generating circuit according to claim 1, further comprising:
   a dimming signal generating unit configured to generate the dimming signal based on input on duty information of the dimming signal.

3. The PWM signal generating circuit according to claim 1, further comprising:
   a controlling unit configured to receive a feedback of an output voltage of the DC-DC converter that is generated based on the PWM signal, and control operations of the PWM signal generating unit.

4. The PWM signal generating circuit according to claim 1, wherein the synchronizing unit is configured to synchronize a rising edge of the dimming signal to a rising edge of the first clock signal, and output the synchronized dimming signal.

5. The PWM signal generating circuit according to claim 4, wherein the synchronizing unit is configured to synchronize the dimming signal to the first clock signal so that a falling edge of the first clock signal comes after the rising edge of the dimming signal.

6. The PWM signal generating circuit according to claim 1, wherein the synchronizing unit comprises:
   a first counter configured to count a length of an on state of the dimming signal based on a second clock signal;
   a second counter configured to count the length of an off state of the dimming signal based on the second clock signal;
   a register configured to store a counter value received from the first counter;
   a comparer configured to compare the stored counter value of the first counter and a counter value received from the second counter;
   a first AND gate configured to output an AND result of the dimming signal and the first clock signal;
   a second AND gate configured to output an AND result of an output of the first AND gate and the second clock signal; and
   a reset-set flip-flop configured to receive an output of the comparer as a reset signal, receive an output of the second AND gate as a set signal, and output the synchronized dimming signal.

7. A light-emitting diode (LED) driver circuit comprising:
   a dimming signal generating unit configured to generate a dimming signal based on a control signal for driving an LED array;
   a synchronizing unit configured to generate a synchronized dimming signal by synchronizing the dimming signal to a first clock signal;
   a pulse-width modulation (PWM) signal generating unit configured to generate a PWM signal having a rising edge in response to the first clock signal having a falling edge while the synchronized dimming signal is on;
   a direct current to direct current (DC-DC) converter configured to provide an output voltage to the LED array based on the PWM signal; and
   an LED driver unit configured to drive the LED array based on the dimming signal.

8. The LED driver circuit according to claim 7, wherein the PWM signal generating unit comprises:
   an oscillator configured to generate the first clock signal.

9. The LED driver circuit according to claim 8, wherein the PWM signal generating unit further comprises:
   a controlling unit configured to receive a feedback of an output voltage of the DC-DC converter that is generated based on the PWM signal, and control operations of the PWM signal generating unit.

10. The LED driver circuit according to claim 7, wherein the synchronizing unit is configured to synchronize a rising edge of the dimming signal to a rising edge of the first clock signal, and output the synchronized dimming signal.

11. The LED driver circuit according to claim 10, wherein the synchronizing unit is configured to synchronize the dimming signal to the first clock signal so that a falling edge of the first clock signal comes after the rising edge of the dimming signal.

12. The LED driver circuit according to claim 7, wherein the synchronizing unit comprises:
   a first counter configured to count a length of an on state of the dimming signal based on a second clock signal;
   a second counter configured to count the length of an off state of the dimming signal based on the second clock signal;
   a register configured to store a counter value received from the first counter;
   a comparer configured to compare the stored counter value of the first counter and a counter value received from the second counter;
   a first AND gate configured to output an AND result of the dimming signal and the first clock signal;
   a second AND gate configured to output an AND result of an output of the first AND gate and the second clock signal; and
   a reset-set flip-flop configured to receive an output of the comparer as a reset signal, receive an output of the second AND gate as a set signal, and output the synchronized dimming signal.

13. The LED driver circuit according to claim 7, wherein the dimming signal generating unit, the synchronizing unit, the PWM signal generating unit, and the LED driver unit are realized in one chip.

14. A method of generating a pulse-width modulation (PWM) signal for a direct current to direct current (DC-DC) converter based on a dimming signal, the method comprising:
   generating a dimming signal;
   generating a synchronized dimming signal by synchronizing the dimming signal to a clock signal; and
   generating the PWM signal having a rising edge in response to the clock signal having a falling edge while the synchronized dimming signal is on.

15. The method of claim 14, further comprising:

generating the clock signal.

16. The method of claim 14, further comprising:

generating the dimming signal based on input on duty information of the dimming signal.

17. The method of claim 14, wherein the synchronization of the dimming signal comprises:

synchronizing a rising edge of the dimming signal to a rising edge of the clock signal.

18. The PWM signal generating circuit according to claim 1, wherein:

the DC-DC converter comprises a booster switch connected to an inductor and a diode, and is configured to provide an output voltage based on the PWM signal; and the PWM signal generating unit is configured to generate the PWM signal for the booster switch.

19. The PWM signal generating circuit according to claim 3, wherein the PWM signal generating unit comprises:

a reset-set (RS) flip-flop configured to receive the first clock signal as a set signal, and receive an output of the controlling unit as a reset signal;

a NOT gate configured to reverse the first clock signal; and an AND gate configured to output an AND result of an output of the RS flip-flop and an output of the NOT gate as the PWM signal.

20. The PWM signal generating circuit according to claim 3, wherein the controlling unit is further configured to receive the first clock signal and the synchronized dimming signal, control the PWM signal generating unit to generate the PWM signal having the rising edge in response to the first clock signal having the falling edge while the synchronized dimming signal is on, and control the PWM signal generating unit to not generate the PWM signal in response to the feedback being greater than or equal to a predetermined voltage.

* * * * *